United States Patent Office 3,515,145
Patented June 2, 1970

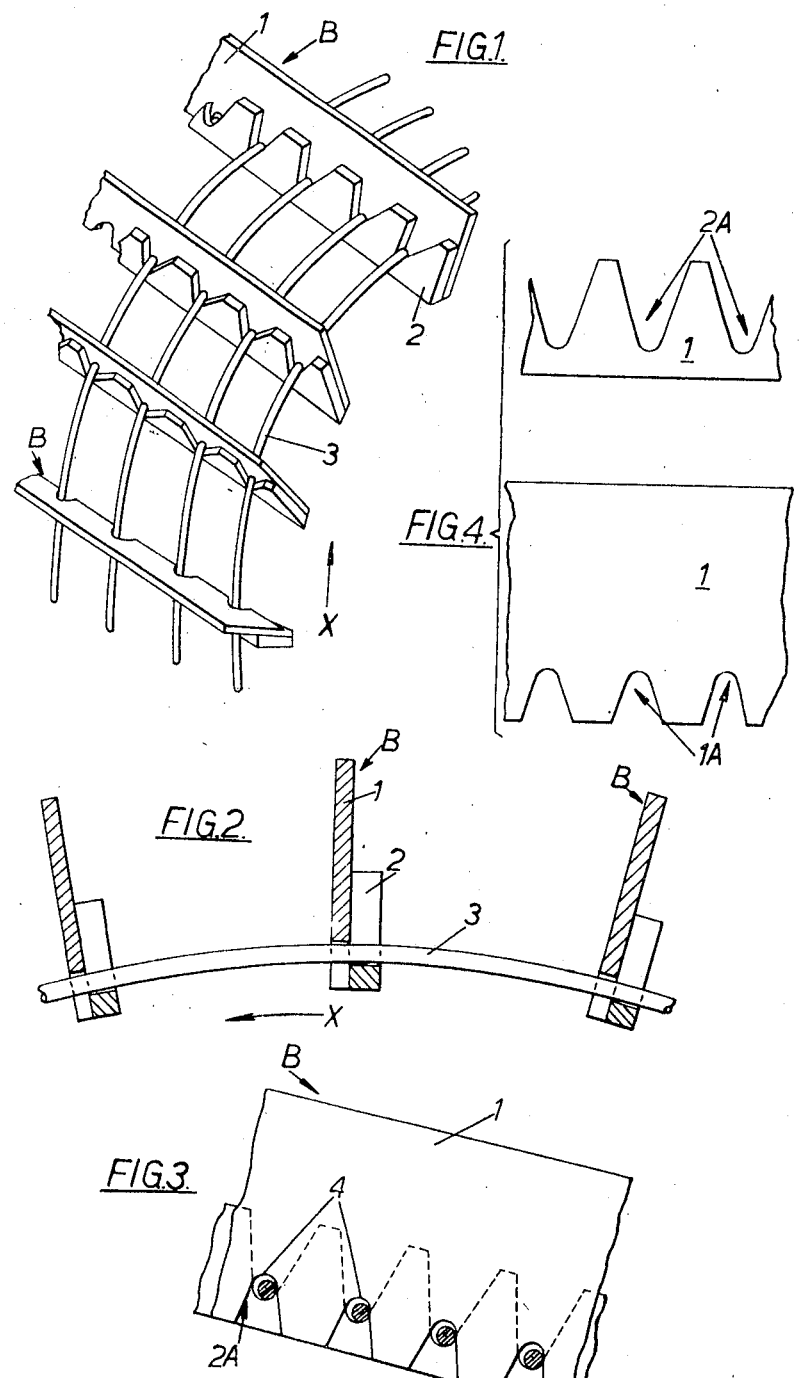

3,515,145
THRESHING CONCAVE
Franz J. Herbsthofer, Kassel-Harleshausen, Germany, assignor to Massey-Ferguson G.m.b.H., Kassel, Germany
Filed Dec. 20, 1967, Ser. No. 692,001
Claims priority, application Great Britain, Dec. 30, 1966, 58,302/66
Int. Cl. A01f 12/24
U.S. Cl. 130—27       3 Claims

ABSTRACT OF THE DISCLOSURE

A concave for a threshing mechanism is discolsed in which each cross bar consists of two composite parts being secured together. Each part has notches which, upon combining the two parts into one cross bar, leaves holes in the bar through which wires pass.

---

This invention relates to threshing mechanism in which a drum or cylinder rotates relative to a so-called concave or reaction member to effect threshing of crop material passed between them. More particularly, the invention relates to threshing mechanism of the type in which the concave or reaction member comprises a plurality of spaced cross bars extending generally axially of the drum or cylinder, and a plurality of spaced side-by-side wires extending through the bars generally in the direction of rotation of the drum or cylinder.

Known threshing mechanisms of the type aforesaid have the disadvantage that the bars are drilled with holes and the wires are then threaded through the holes, and this is a very tiring, and time and labor consuming operation.

It has been proposed to overcome this disadvantage by making the mechanism of stamped sheet parts, but such a mechanism is not self-cleaning, while a concave with wires is self-cleaning due to vibration of the wires.

According to the present invention, a concave or reaction member for threshing mechanism of the type aforesaid is provided, in which each cross bar is a composite bar formed by two bar components which are so formed that together they define holes through which the wires pass, both of the bar components having notches into which the wires are inserted prior to assembly of the composite bar.

Preferably, said notches in both bar components are directly opposed.

An embodiment of the invention will now be described, by way of example, with reference to the accompanying drawing, in which:

FIG. 1 is a fragmentary perspective view of a concave or reaction member according to the present invention, FIG. 2 is a sectional side view corresponding to FIG. 1 and on a larger scale, FIG. 3 is a fragmentary front view of one of the composite bars, and FIG. 4 is an exploded front view of one of the composite bars.

Referring to the drawing, a concave or reaction member for a threshing mechanism of the type stated has a series of cross bars B which are composite bars each formed by bar components 1 and 2 secured together. Opposed end faces of the bar components 1 and 2 are toothed, the respective notches 1A, 2A so formed are directly opposed and wires 3 pass through holes 4 defined by the walls of the opposed teeth.

In assembling the concave, the wires are, for example, first fitted into the notches 2A of the bars 2, and the component bars 1 which are interconnected at their ends by rails (not shown) are then fitted so that the notches 1A fit over the wires 3. The bars 1 abut and are secured to the bars 2, for example, by spot welding, riveting, or by nuts and bolts.

The component bars 1 and 2 can be formed as stampings so that boring of holes for the wires is no longer necessary and, as the wires are fitted prior to formation of the holes 4, threading of the wire through holes is also no longer necessary.

The component bars 2 lie in advance of the bars I in relation to the direction of rotation of the cylinder (not shown). That is to say, the bars 2 and 1 are located sequentially in the direction of rotation of the cylinder, as shown in FIGS. 1 and 2 in which the arrows X indicate the direction of rotation of the cylinder. Threshing is thus effected between the cylinder and the bars 2. The surfaces of the inwardly directed ends of the cross bars form one common surface at the inside, whereas the outwardly directed ends of the component bars 1 and 2 are preferably of unequal length. The wires 3 have a clearance fit in the holes 4 in order that the wires will vibrate during threshing and thus impart self-cleaning properties to the concave.

I claim:

1. In a threshing concave having a series of wires and a plurality of bars extending transversely to the wires, said concave to be used in cooperation with a rotatable threshing cylinder, the improvement wherein each of said bars comprises a pair of notched components in which the notches in both bar components are equally spaced and are directly opposed to each other in the composite bar and wherein said notched components are secured together such that the notches cooperate to define holes for receiving the wires and having the bar components of each cross bar abut face to face, one of the bar components having inwardly opening notches and the other having outwardly opening notches, with the latter bar component being located in advance of the former bar component in relation to the intended direction of rotation of the threshing cylinder.

2. A concave as claimed in claim 1 in which the surfaces of the inwardly directed ends of the cross bars form one common surface at the inside.

3. A concave as claimed in claim 2 in which the outwardly directed ends of the two types of bar components are of unequal length.

References Cited

UNITED STATES PATENTS

| | | | |
|---|---|---|---|
| 1,769,128 | 7/1930 | Fisher | 130—27.10 |
| 1,844,091 | 2/1932 | Hill et al. | 130—27.10 |

FOREIGN PATENTS 518,567  10/1929  Germany.

ANTONIO F. GUIDA, Primary Examiner